United States Patent
Lee et al.

(10) Patent No.: US 7,671,514 B2
(45) Date of Patent: Mar. 2, 2010

(54) ELECTROACTIVE SOLID-STATE ACTUATOR AND METHOD OF MANUFACTURING THE SAME

(75) Inventors: Kwi Jong Lee, Kyungki-do (KR); Young Kwan Lee, Kyungki-do (KR); Jae Do Nam, Kyungki-do (KR); Hyouk Ryeol Choi, Kyungki-do (KR); Mi Suk Cho, Kyungki-do (KR); Ja Choon Koo, Kyungki-do (KR)

(73) Assignees: Samsung Electro-Mechanics. Co. Ltd, Suwon, Kyungki-Do (KR); Sungkyunkwan University, Seoul (KR)

( * ) Notice: Subject to any disclaimer, the term of this patent is extended or adjusted under 35 U.S.C. 154(b) by 1387 days.

(21) Appl. No.: 11/080,294

(22) Filed: Mar. 15, 2005

(65) Prior Publication Data

US 2006/0086596 A1   Apr. 27, 2006

(30) Foreign Application Priority Data

Oct. 22, 2004   (KR) .................. 10-2004-0085008

(51) Int. Cl.
*H01L 41/08* (2006.01)
(52) U.S. Cl. ..................... 310/328; 310/800
(58) Field of Classification Search ............. 310/328, 310/311, 800, 309; 29/25.35; *H01L 41/08, H01L 41/09*
See application file for complete search history.

(56) References Cited

U.S. PATENT DOCUMENTS

| | | | | |
|---|---|---|---|---|
| 6,586,859 | B2 * | 7/2003 | Kornbluh et al. | 310/309 |
| 7,034,432 | B1 * | 4/2006 | Pelrine et al. | 310/309 |
| 7,443,087 | B2 * | 10/2008 | Hattori et al. | 310/800 |
| 7,586,242 | B2 * | 9/2009 | Yokoyama et al. | 310/800 |
| 2007/0216262 | A1 | 9/2007 | Hattori et al. | |

FOREIGN PATENT DOCUMENTS

| | | | |
|---|---|---|---|
| JP | 2004098199 A | | 4/2004 |
| JP | 2005304168 A | | 10/2005 |
| JP | 2006-050780 | * | 2/2006 |
| JP | 2006050780 A | | 2/2006 |

\* cited by examiner

*Primary Examiner*—Walter Benson
*Assistant Examiner*—Karen B Addison
(74) *Attorney, Agent, or Firm*—Volpe and Koenig, P.C.

(57) ABSTRACT

The present invention provides an electroactive solid-state actuator, including a solid polymer electrolyte film having first and second main surfaces facing each other, and first and second conductive polymer layers infiltrated into the first and second main surfaces of the solid polymer electrolyte film. Further, a method of manufacturing the electroactive solid-state actuator is provided, the method including preparing a solid polymer film having first and second main surfaces facing each other, infiltrating a monomer of a conductive polymer into the first and second main surfaces of the solid polymer film, followed by polymerization, to form first and second conductive polymer layers, and immersing the solid polymer film into an ionic liquid or liquid electrolyte to be converted to an electrically conductive polymer.

7 Claims, 4 Drawing Sheets

(a)

(b)

ELECTROACTIVE SOLID-STATE ACTUATOR AND METHOD OF MANUFACTURING THE SAME

RELATED APPLICATION

The present invention is based on, and claims priority from, Korean Application No. 2004-85008 filed Oct. 22, 2004, the disclosure of which is incorporated by reference herein in its entirety.

BACKGROUND OF THE INVENTION

1. Field of the Invention

The present invention relates generally to an electroactive solid-state actuator, and, more particularly, to an electroactive solid-state actuator having a novel single layer structure, which is advantageous because it solves the problem of contact between a conductive polymer and a solid electrolyte.

2. Description of the Related Art

As well known to those skilled in the art, an electroactive actuator refers to an actuator using an electroactive polymer (EAP). The electroactive polymer is advantageous because it has larger variation and smaller density, as well as faster response properties, compared to those of shape memory alloys (SMA) or electoactive ceramics (EAC) as other small actuator materials. Thus, the electroactive polymer is known to have properties most similar to those of natural muscles, and, at present, is vigorously and thoroughly studied for application to various small robot actuators.

In addition, a conventional electroactive actuator which has used a liquid electrolyte has drawbacks, such as limited variation and a low current application range. Thus, in recent years, an electroactive solid-state actuator having a solid electrolyte substituted for the liquid electrolyte has been developed.

Conventionally, an electroactive solid-state actuator comprises a three-layer structure including an electroactive polymer sheet, made of a silicone rubber or an acrylic material, and a pair of compliant electrodes formed on opposite surfaces of the sheet, which is illustrated in FIG. 1.

Referring to FIG. 1, the electroactive solid-state actuator 10 includes a solid electrolyte film 11 and conductive polymer layers 13a and 13b formed on opposite surfaces of the solid electrolyte film 11. As such, the conductive polymer layers 13a and 13b, which are additional layers serving as compliant electrodes, are connected to two electrodes 15a and 15b of a voltage application part 17, respectively.

When the voltage is applied through the two electrodes 15a and 15b, respective conductive polymer layers 13a and 13b are caused to be polar. Further, the cationic component of the solid electrolyte film 11 is shifted to any one conductive polymer layer 13a or 13b as a cathode. Thereby, expansion occurs at the electrolyte portion adjacent to any one conductive polymer layer 13a or 13b, while constriction occurs at the electrolyte portion adjacent to the other conductive polymer layer 13b or 13a. Thus, curvature toward the other conductive polymer layer 13b or 13a takes place. Such actuation can be variously controlled in accordance with the polarity and magnitude of the applied voltage.

The conventional electroactive solid-state actuator 10 basically has a three-layer structure, that is, conductive polymer layer 13a/polymer electrolyte film 11/conductive polymer layer 13b. The three-layer structure is obtained by attaching the conductive polymer layers 13a and 13b to the opposite surfaces of the previously prepared polymer electrolyte film 11. Thus, the attachment process is complicated, and also, contact defects may easily occur. In particular, low adhesive strength may cause undesired detachment due to variation occurring upon actuation, whereby the actuator may become inoperative.

Hence, there is the need for a new technique of manufacturing an actuator having a more stable actuation structure while solving the problems of the three-layer structure of the conventional electroactive solid-state actuator.

SUMMARY OF THE INVENTION

Accordingly, the present invention has been made keeping in mind the above problems occurring in the prior art, and an object of the present invention is to provide an electroactive solid-state actuator having a single layer structure, by synthesizing a monomer of a conductive polymer on a solid electrolyte to form conductive polymer layers on opposite surfaces of the solid electrolyte film.

Another object of the present invention is to provide a method of manufacturing the electroactive solid-state actuator.

In order to accomplish the above objects, the present invention provides an electroactive solid-state actuator, comprising a solid polymer electrolyte film having first and second main surfaces facing each other, and first and second conductive polymer layers infiltrated into the first and second main surfaces of the solid polymer electrolyte film.

The first and second conductive polymer layers are formed by polymerizing a monomer of a conductive polymer material infiltrated into the first and second main surfaces of the solid polymer electrolyte film, and the first and second conductive polymer layers comprise any conductive polymer material selected from the group consisting of polypyrrole, polyaniline, poly(3,4-ethylenedioxythiophene), polyacetylene, poly(p-phenylene), polythiophene, poly(p-phenylene vinylene), and poly(tienylene vinylene).

The solid polymer electrolyte film is obtained by immersing a solid polymer film into a liquid electrolyte or ionic liquid to infiltrate an organic cation or organic anion into the solid polymer film.

The polymer film used as a basic layer of the solid polymer electrolyte film comprises acrylonitrile butadiene rubber.

Further, the present invention provides a method of manufacturing an electroactive solid-state actuator. The method includes preparing a solid polymer film having first and second main surfaces facing each other, infiltrating a monomer of a conductive polymer into the first and second main surfaces of the solid polymer film, followed by polymerization, to form first and second conductive polymer layers, and immersing the solid polymer film into an ionic liquid or liquid electrolyte to be converted into a conductive polymer.

Preferably, the formation of the first and second conductive polymer layers includes immersing the solid polymer film into the monomer solution of the conductive polymer, polymerizing the monomer on the solid polymer film to form the conductive polymer layer, and cutting the solid polymer film into a predetermined size to expose side surfaces thereof. Due to the cutting process, the solid polymer film has the first and second conductive polymer layers formed on the first and second main surfaces thereof and separated from each other by the cut side surface thereof.

The monomer used in the formation of the conductive polymer is selected from the group consisting of pyrrole, aniline, ethylenedioxythiophene, acetylene, phenylene, thiophene, phenylene vinylene, thienylene vinylene, and combinations thereof.

The ionic liquid or liquid electrolyte includes an organic cation selected from among imidazolium, pyridinium and quaternary ammonium, and an organic anion selected from among $BF_4^-$, $CF_3SO_3^-$ and $(CF_3SO_2)_2N^-$.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, a detailed description will be given of an electroactive solid-state actuator and a method of manufacturing the same according to the present invention, with reference to the accompanying drawings.

Figure 2:
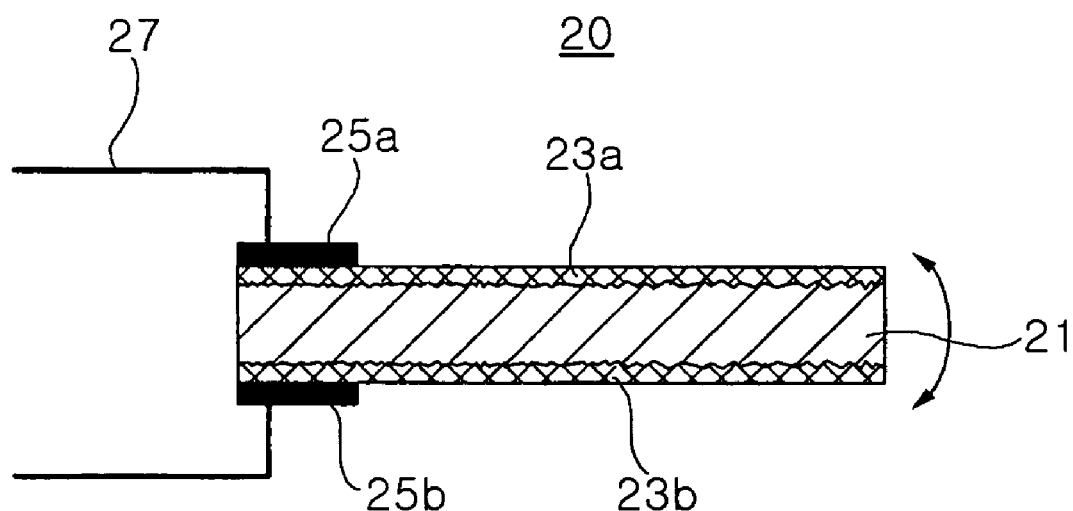
FIG. 2 is a sectional view showing an electroactive solid-state actuator, according to the present invention.

FIG. 2 is a sectional view showing an electroactive solid-state actuator, according to the present invention.

As shown in FIG. 2, an electroactive solid-state actuator 20 includes a solid electrolyte film 21, and first and second conductive polymer layers 23a and 23b formed on opposite surfaces of the solid electrolyte film 21. The first and second conductive polymer layers 23a and 23b, which are integrated layers functioning as compliant electrodes, are connected to two electrodes 25a and 25b of a voltage application part 27, respectively.

Figure 1:
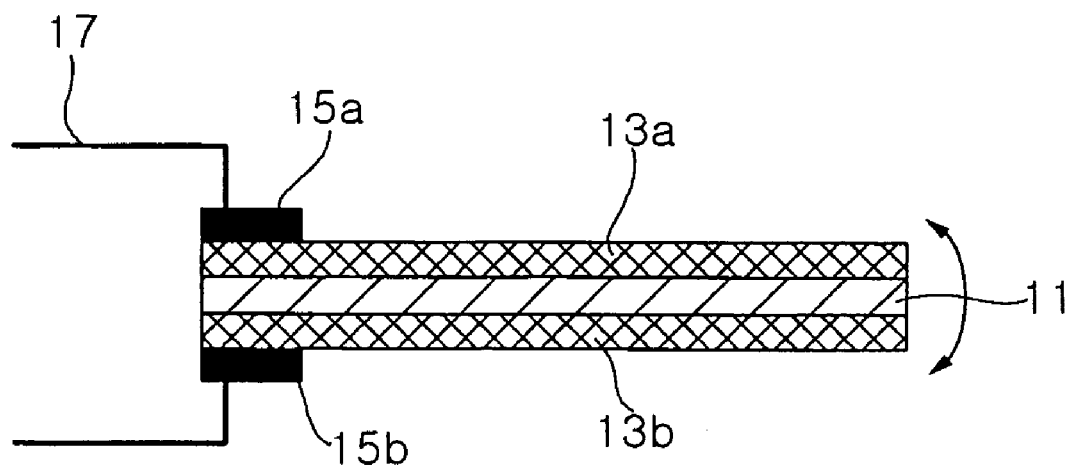
FIG. 1 is a sectional view showing a conventional electroactive solid-state actuator.

Although being similar to a conventional structure shown in FIG. 1, the structure of the electroactive solid-state actuator 20 according to the present invention is characterized in that the first and second conductive polymer layers 23a and 23b are not additional layers attached to the solid electrolyte film 21, but layers resulting from the polymerization on the solid electrolyte film 21. That is, the first and second conductive polymer layers 23a and 23b are integrated to the solid electrolyte film 21. Thus, unlike a conventional three-layer structure attached together, the above layer structure of the present invention is formed in a single layer, whereby layer attachment defects may be basically solved.

The conductive polymer layers 23a and 23b of the present invention are obtained by polymerizing a monomer of a conductive polymer material infiltrated into the first and second main surfaces of the solid electrolyte film 21. The conductive polymer layers 23a and 23b are formed of any conductive polymer material selected from the group consisting of polypyrrole, polyaniline, poly(3,4-ethylenedioxythiophene), polyacetylene, poly(p-phenylene), polythiophene, poly(p-phenylene vinylene), and poly(tienylene vinylene).

The solid polymer electrolyte film 21 is prepared using a solid polymer film to easily form the conductive polymer layers 23a and 23b. That is, the conductive polymer layers 23a and 23b are formed on the opposite surfaces of the solid polymer film as mentioned above, followed by immersion into a liquid electrolyte or an ionic liquid to infiltrate an organic cation or an organic anion into the solid polymer film, thus obtaining the desired solid polymer electrolyte film 21.

As the solid polymer film for the solid polymer electrolyte film 21, any polymer material may be used so long as the monomer of the conductive polymer may be infiltrated into the surface thereof and then polymerized, and the organic cation or anion may be infiltrated therein. A solid polymer satisfying the above requirement is exemplified by acrylonitrile butadiene rubber (NBR).

The electroactive solid-state actuator having a single polymer film as a basic structure has a single layer structure. That is, the conductive polymer layer, which is not additionally attached to the polymer film, is obtained by polymerizing the monomer infiltrated into the opposite surfaces of the polymer film, and thus, it corresponds to the surface of the polymer film. Hence, in the present invention, an additional attachment process can be omitted, and as well, layer attachment defects due to low adhesive strength can be basically overcome.

Meanwhile, a method of manufacturing the electroactive solid-state actuator of the present invention includes the steps of preparing the solid polymer film, infiltrating the monomer of the conductive polymer into the opposite surfaces of the solid polymer film to form the first and second conductive polymer layers, and immersing the solid polymer film into the ionic liquid or liquid electrolyte to be converted into the conductive polymer. According to the present method, manufacture on a large scale is possible. The preferable method is explained with reference to FIG. 3.

Figure 3:
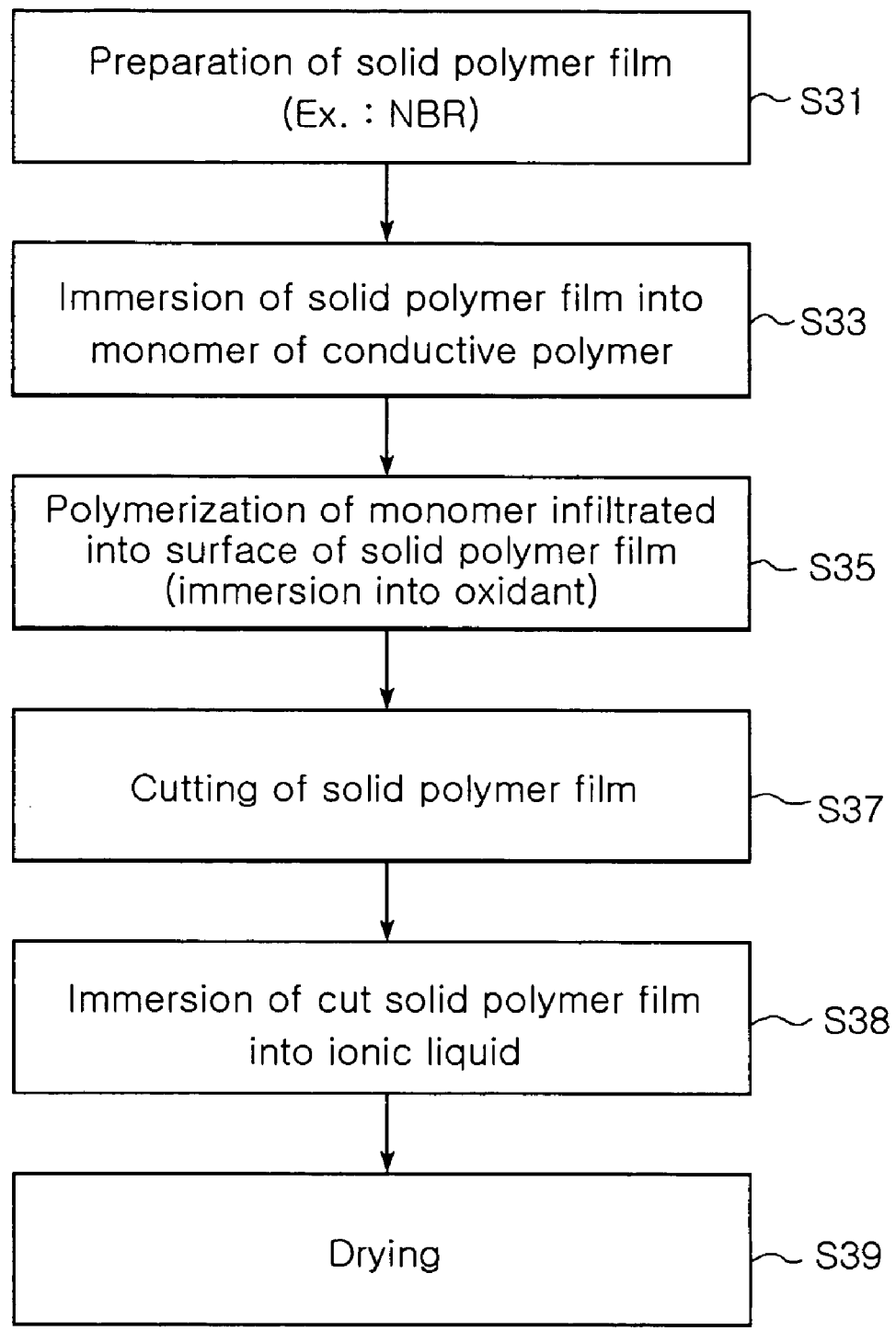
FIG. 3 is a flow chart showing a process of manufacturing the electroactive solid-state actuator, according to the present invention.

FIG. 3 is a flow chart showing the method of manufacturing the electroactive solid-state actuator, according to the present invention.

As apparent from FIG. 3, the manufacturing method of the present invention starts from the step (S31) of preparing a solid polymer film having first and second main surfaces facing each other. As the solid polymer film, any polymer material may be used so long as the monomer of the conductive polymer may be infiltrated into the surface thereof and then polymerized, and the organic cation or anion may be infiltrated therein, as mentioned above. The preferable solid polymer includes, for example, acrylonitrile butadiene rubber (NBR). Usable in the present invention, NBR contains an acrylonitrile component of about 28-40%.

Subsequently, in the step (S33), the solid polymer film is immersed into a monomer solution of the conductive polymer. As such, the preferable monomer includes, but being not limited to, pyrrole, aniline, ethylenedioxythiophene, acetylene, phenylene, thiophene, phenylene vinylene, thienylene vinylene, or combinations thereof. Upon the immersion process, the monomer component constituting the conductive polymer is infiltrated into the surface of the polymer film, and the solid polymer is swollen. At this time, the preferable infiltration depth of the monomer component is about 5 to 20% of the polymer thickness. If the infiltration depth is less than 5%, it is difficult to obtain a uniform conductive polymer layer on the entire surface of the polymer film. On the other hand, if it exceeds 20%, an electrolyte portion, resulting from the following process, cannot have a desired thickness.

Thereafter, in the step (S35), the monomer infiltrated into the surface of the solid polymer film is polymerized. This polymerization is performed by immersing the solid polymer film into a solution of an oxidant, such as $FeCl_3$, for a predetermined time period. Thus, the infiltrated monomer is polymerized under the polymerization condition, such as the oxidant solution, to form a desired conductive polymer. Consequently, the conductive polymer layers included in the single layer structure can be obtained. Then, a washing process is additionally carried out. For example, the solid polymer film having the conductive polymer layers is washed with methyl alcohol, to obtain the conductive polymer layer having an even surface.

The step (S37) of cutting the solid polymer film into a predetermined size to expose side surfaces thereof is performed. Thereby, the conductive polymer layers remain on the first and second main surfaces of the solid polymer film, and one of the conductive polymer layers is separated from the other of the conductive polymer layers by the cut side surface of the solid polymer film. Further, the polymer portion of the side surface exposed through the cutting process is provided as an infiltration space of the organic cation and anion in the following process. The cutting process may be changed, as appropriate to desired sizes and forms of a final product.

After the cutting process (S37), the step (S38) of immersing the solid polymer film into the ionic liquid or liquid electrolyte to be converted into the conductive polymer is carried out. Usable in the present step, the ionic liquid or liquid electrolyte includes the organic cation and the organic anion able to be infiltrated into the polymer film. The organic cation is selected from the group consisting of imidazolium, pyridinium and quaternary ammonium, and the organic anion is selected from the group consisting of $BF_4^-$, $CF_3SO_3^-$ and $(CF_3SO_2)_2N^-$, but being not limited thereto. For instance, 1-ethyl-3-methylimidazole (EMI) is reacted with alkyl halide to synthesize 1-ethyl-3-methylimidazolium halide (EMIX), to which $BF_4^-$, $CF_3SO_3^-$ and $(CF_3SO_2)_2N^-$ are added, to prepare various ionic liquids, such as $EMIBF_4^-$, EMI $CF_3SO_3^-$ and EMI $(CF_3SO_2)_2N^-$. Alternatively, pyridinium is reacted with alkyl halide to synthesize alkylpyridinium halide (APX), to which $BF_4^-$, $CF_3SO_3^-$ and $(CF_3SO_2)_2N^-$ are added, to prepare various ionic liquids, such as $APBF_4$, $APCF_3SO_3$ and $AP(CH_3SO_2)_2N$.

Finally, the product converted into the solid electrolyte film is dried (S39), thereby completing the solid electrolyte film having the conductive polymer layers on the opposite surfaces thereof. The drying process is preferably performed at room temperature, to minimize deformation.

A better understanding of the present invention may be obtained in light of the following example which is set forth to illustrate, but is not to be construed to limit the present invention.

EXAMPLE

Figure 4:
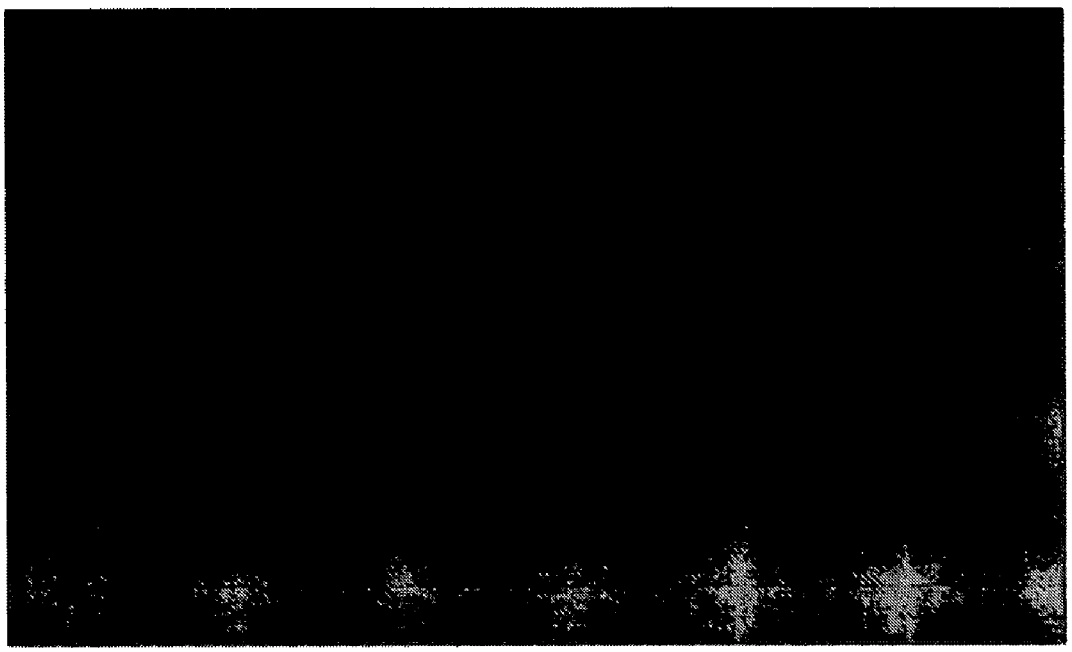
FIGS. 4a and 4b are photographs showing the electroactive solid-state actuator obtained in Example of the present invention.
Figure 4:

As a solid polymer film, an NBR film containing a 32% acrylonitrile component was used, in which the NBR film was about 180 μm thick (FIG. 4a).

The NBR film was immersed into an ethylenedioxythiophene (EDOT) monomer solution for 10 min. Then, the NBR film was removed from the monomer solution and the surface thereof was rubbed with filter paper.

Subsequently, the NBR film was immersed into a $FeCl_4$ solution (1-1.5 M) for 24 hours to polymerize the EDOT monomer. As the result, the EDOT monomer infiltrated into the NBR surface was polymerized into poly(3,4-ethylenedioxythiophene) (PEDOT). The surface of the film was washed several times with methyl alcohol.

After the washing process, the NBR film having a conductive polymer layer formed on the entire surface thereof was cut into a square form to expose four side surfaces thereof. As apparent from the exposed side surfaces of the film, the conductive polymer layers were separated from each other by the NBR component. Each of the conductive polymer layers had a thickness of about 20-30 μm.

The cut NBR film was immersed into a $LiClO_4$/propylenecarbonate electrolyte for 24 hours so that the ionic component in the electrolyte was infiltrated into the NBR, followed by drying in a vacuum oven at room temperature for 24 hours. The resulting electroactive solid-state actuator is shown in FIG. 4b. In the drawing, the black portion shows the conductive polymer portion.

Figure 5:
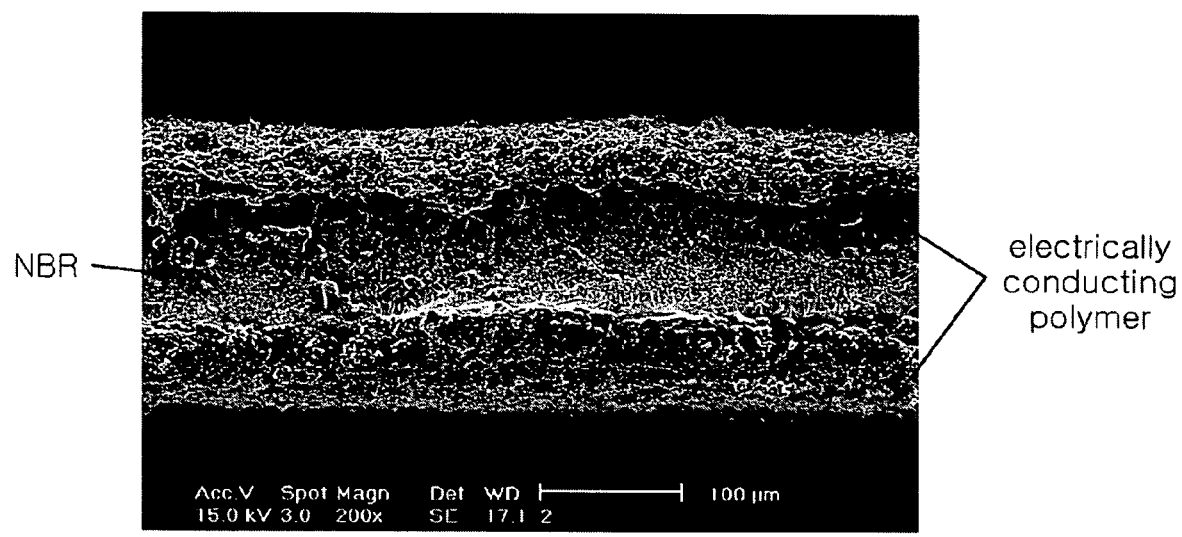
FIG. 5 is an SEM photograph showing a cross-section of the electroactive solid-state actuator obtained in Example of the present invention.

FIG. 5 is an SEM photograph showing the cross-section of the electroactive solid-state actuator according to the present invention. From FIG. 5, it can be seen that the conductive polymer layers having uniform thickness are formed in the state of having been infiltrated into opposite surfaces of NBR.

The above product was measured for ionic conductance at room temperature at $10^{-3}$ S/cm. As a result, it had a similar level to a conventional electroactive solid-state actuator, and also, had better mechanical properties than a conventional electroactive solid-state actuator having a three-layer structure.

As described above, the present invention provides an electroactive solid-state actuator and a method of manufacturing the same. According to the present invention, an infiltration process is applied to a single layer of polymer film, and thus, the conductive polymer layer and the electrolyte portion are formed. Therefore, an attachment process of the conductive polymer layer and the electrolyte film can be omitted, and layer attachment defects due to low adhesive strength can be overcome.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An electroactive solid-state actuator, comprising:
   a solid polymer electrolyte film having first and second main surfaces facing each other; and
   first and second conductive polymer layers infiltrated into the first and second main surfaces of the solid polymer electrolyte film, wherein the first and second conductive polymer layers are formed by polymerizing a monomer of a conductive polymer material infiltrated into the first and second main surfaces of the solid polymer electrolyte film.

2. The actuator as set forth in claim 1, wherein the solid polymer electrolyte film comprises acrylonitrile butadiene rubber.

3. The actuator as set forth in claim 1, wherein the solid polymer electrolyte film comprises acrylonitrile butadiene rubber.

4. The actuator as set forth in claim 1, wherein the first and second conductive polymer layers comprise any conductive polymer material selected from the group consisting of polypyrrole, polyaniline, poly(3,4-ethylenedioxythiophene), polyacetylene, poly(p-phenylene), polythiophene, poly(p-phenylene vinylene), and poly(tienylene vinylene).

5. The actuator as set forth in claim 4, wherein the solid polymer electrolyte film comprises acrylonitrile butadiene rubber.

6. The actuator as set forth in claim 1, wherein the solid polymer electrolyte film is obtained by immersing a solid polymer film into a liquid electrolyte or ionic liquid to infiltrate an organic cation or organic anion into the solid polymer film.

7. The actuator as set forth in claim 6, wherein the solid polymer electrolyte film comprises acrylonitrile butadiene rubber.

* * * * *